3,263,736
PROTECTOR FOR VEHICLE WINDSHIELDS AND WINDOWS
Filed Oct. 30, 1963
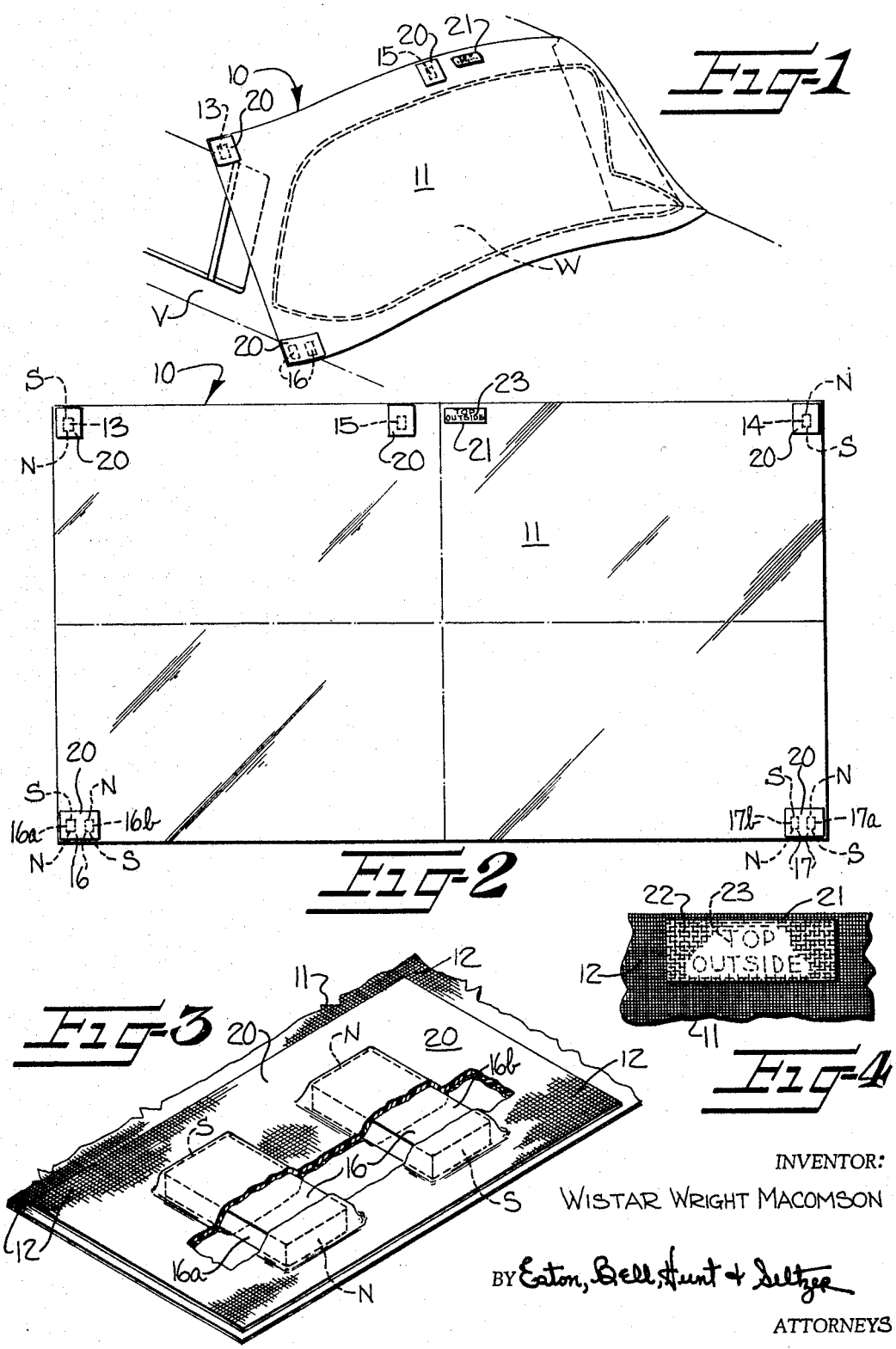
INVENTOR:
WISTAR WRIGHT MACOMSON
BY Eaton, Bell, Hunt & Seltzer
ATTORNEYS 3,263,736
PROTECTOR FOR VEHICLE WINDSHIELDS AND WINDOWS
Wistar Wright Macomson, Charlotte, N.C., assignor to Allied Plastics, Inc., Gastonia, N.C., a corporation of North Carolina
Filed Oct. 30, 1963, Ser. No. 320,038
2 Claims. (Cl. 160—368)

The present invention relates to a protective cover for a windshield of a vehicle which protects the windshield from the collection of snow, ice, rain or other foreign matter thereon when the vehicle is not in use, and is a continuation-in-part of my copending application Serial No. 192,391, filed May 4, 1962, now abandoned.

It is an object of the present invention to provide an improved protective cover of the type described having increased effective life which may be easily and quickly applied to a vehicle over the windshield thereof and which more effectively protects the windshield from the collection of snow, ice, etc.

It is a more specific object of the present invention to provide a protective cover of the type described of an ultraviolet resistant, heat absorbent material, wherein magnets are provided at the four corners of the rectangular cover and adjacent the center thereof at the top edge to provide secure attachment of the cover to the vehicle, the cover being reinforced at each magnet to increase the effective life thereof, and wherein indicating means is provided for indicating the manner in which the cover should be applied to the vehicle for maximum securement by the magnets.

Some of the objects of the invention having been stated, other objects will appear as the description proceeds, when taken in connection with the accompanying drawings, in which:

FIGURE 1 is a perspective view of a protective cover according to the present invention applied to a vehicle in covering relation to the windshield thereof;

FIGURE 2 is an enlarged plan view of the protective cover shown in FIGURE 1;

FIGURE 3 is an enlarged fragmentary isometric view of the lower left-hand corner portion of the protector shown in FIGURE 2 with portions broken away; and FIGURE 4 is an enlarged plan detail of an upper medial portion of the protective cover shown in FIGURE 2 which is lined to show the contrasting colors of portions thereof.

Referring now specifically to the drawing, the protective cover embodying the features of the present invention is generally indicated at 10 and is shown in FIGURE 1 applied to a vehicle V having a windshield W. Protector 10 comprises an elongate rectangular body 11 of sufficient dimensions to completely cover and overlie the windshields W of most vehicles presently available commercially.

Body 11 is formed of a pliable, waterproof, ultraviolet resistant, heat absorbent plastic material, such as polyethylene which has suitable amounts of carbon black incorporated therein. The carbon black incorporated in the polyethylene material imparts a black color to body 11 as indicated at 12 in FIGURES 3 and 4, and absorbs the ultraviolet rays of sunlight striking the cover 10. As is well known, ultraviolet rays have a derogatory effect upon polyethylene and after a relatively short period of exposure thereto, normal polyethylene will become very brittle and will crack and become useless. In the instant protective cover 10, this derogation of the polyethylene by ultraviolet rays is materially lessened by the absorption of these ultraviolet rays by the carbon black. Also, the carbon black absorbs heat more rapidly than conventional protective covers such that protective cover 10 prevents the formation of ice or the collection of snow thereon for a longer period of time and facilitates melting of such ice and/or snow so as to dissipate the same more quickly. Preferably, the plastic material of which body 11 is formed is of about two (2) mils in thickness for reasons to be presently described.

Single individual magnets 13, 14 are disposed at each of the top corners of body 11 in juxtaposed relation to one face of body 11 and are disposed with corresponding poles thereof reversed, as indicated by the letters N and S in FIGURE 2. For example, as illustrated in the drawing, magnet 13 in the upper left-hand corner of body 11 has the south pole thereof uppermost whereas magnet 14 in the upper right-hand corner of body 11 has the north pole thereof disposed uppermost. Therefore, when body 11 is folded transversely along the transverse center line into juxtaposed halves, magnets 13 and 14 will be placed in juxtaposed facing relation and mutually attract each other to facilitate folding of body 11 and to secure the same in folded condition. Another individual magnet 15 is disposed adjacent the top edge of body 11 and adjacent but offset to one side of the transverse center line thereof so as not to interfere with transverse folding of body 11.

Pairs of magnets 16, 17 are disposed at the lower corners of body 11 and have the magnets 16a, 16b and 17a, 17b thereof spaced a small predetermined distance apart to permit the lower corners of said body to conform to any curvature of the portion of a vehicle to which the same is to be attached. Magnets 16a and 16b have corresponding poles thereof reversed such that the same are directed in opposite directions as shown in FIGURES 2 and 3. For example, magnet 16a has the south pole thereof disposed uppermost whereas magnet 16b has the north pole thereof disposed uppermost. Magnets 17a and 17b also have corresponding poles thereof reversed, e.g., magnet 17a has the north pole uppermost whereas magnet 17b has the south pole uppermost, relative to each other and, in addition, magnets 17a, 17b have the poles thereof reversed relative to corresponding poles of magnets 16a and 16b such that when the body 11 is transversely folded about the transverse center line, magnets 16a, 16b and 17a, 17b will be placed in juxtaposed facing relation and will mutually attract each other. Also, it is noted that magnets 13 and 14 are arranged relative to magnets 16a and 17a such that if body 11 is folded longitudinally along its longitudinal center line, these magnets will also mutually attract to aid in this folding of the body 11 and to secure the same in folded condition.

Each of the individual magnets 13, 14, 15 and each pair of magnets 16, 17 are secured to body 11 by patches 20 adhesively secured to body 11 on all sides of each magnet to maintain the positional arrangement of the magnets relative to body 11 and relative to each other. Patches 20 are also formed of the pliable, opaque, heat absorbent polyethylene material and are of greater thickness than body 11. Preferably, patches 20 are of about four (4) mils in thickness and serve to reinforce the portions of body 11 at which the magnets are disposed to increase the effective life thereof.

A patch 21 of pliable material is adhesively secured to the face of body 11 on which the magnets and patches 20 are secured and adjacent the top edge thereof. Patch 21 is of a contrasting color, as indicated at 22 in FIGURE 4 by the lining for the color yellow, relative to body 11 so that the same is clearly visible when body 11 is unfolded. Also, patch 21 preferably is provided with suitable indicia 23 to indicate that the edge adjacent thereto is the top edge of body 11 and that the face of body 11 opposite to the face on which patch 21 is secured should be placed in contiguous relation to the vehicle V so that the lesser thickness of the polyethylene material of body 11 will be between the magnets and the metal of the vehicle so that maximum securement of cover 10 to the vehicle will be achieved.

From the foregoing, it is apparent that applicant has provided an improved protective cover for use with windshields of vehicles having increased effective life and providing increased protection therefor.

In the drawings and specification there has been set forth a preferred embodiment of the invention and, although specific terms are employed, they are used in a generic and descriptive sense only and not for purposes of limitation, the scope of the invention being defined in the claims.

I claim:
1. A protective cover for a windshield of a vehicle comprising
   (a) an elongate, generally rectangular body of pliable, opaque, heat absorbent, plastic material of a thickness of about two (2) mils, said body being adapted to be positioned in overlying relation to the windshield of the vehicle and, when so positioned, having top and bottom edges,
   (b) a permanent magnet disposed at each of the upper corners of said body in juxtaposed relation thereto, said magnets being positioned relative to each other so as to mutually attract each other when placed in juxtaposed facing relation when the body is folded transversely thereof in juxtaposed halves,
   (c) a pair of permanent magnets disposed at each of the lower corners of said body in juxtaposed relation thereto, said magnets in each of said pairs being spaced a small predetermined distance apart to permit the lower corners of said body to conform to any curvature of the portion of a vehicle to which the same are to be attached, said magnets in each of said pairs being reversed so that corresponding poles thereof are oppositely directed, and said pairs of magnets being arranged relative to each other so as to mutually attract each other when placed in juxtaposed facing relation when said body is transversely folded,
   (d) another permanent magnet disposed in a medial portion of and adjacent the top edge of said body,
   (e) a patch of pliable plastic material of a greater thickness than said body and overlying each of said pairs of magnets and each of said individual magnets and being adhesively secured to said body on all sides of each of said magnets including said magnets in each of said pairs to maintain the positional arrangement of said magnets relative to each other and to said body and to reinforce the portions of said body at which the magnets are disposed, and
   (f) visual indicating means carried by said body on the same face on which said magnets and patches are disposed and in a medial portion thereof and adjacent the top edge thereof for indicating to a user of said cover which side edge is the top edge and which face of the cover should be placed in contiguous relation to the vehicle to achieve maximum securement of the cover to the vehicle.
2. A protective cover for a windshield of a vehicle comprising
   (a) an elongate, generally rectangular body of pliable, opaque, heat absorbent polyethylene material of a thickness of about two (2) mils, said body being adapted to be positioned in overlying relation to the windshield of the vehicle and, when so positioned, having top and bottom edges,
   (b) a permanent magnet disposed at each of the upper corners of said body in juxtaposed relation to one face thereof, said magnets being positioned relative to each other so as to mutually attract each other when placed in juxtaposed facing relation when the body is folded transversely thereof in juxtaposed halves,
   (c) a pair of permanent magnets disposed at each of the lower corners of said body in juxtaposed relation to said one face thereof, said magnets in each of said pairs being spaced a small predetermined distance apart to permit the lower corners of said body to conform to any curvature of the portion of a vehicle to which the same are to be attached, said magnets in each of said pairs being reversed so that corresponding poles thereof are oppositely directed and said pairs of magnets being arranged relative to each other so as to mutually attract each other when placed in juxtaposed facing relation when said body is transversely folded,
   (d) another permanent magnet disposed in juxtaposed relation to said one face of said body and adjacent the top edge thereof and adjacent to but spaced to one side of the transverse center line of said body,
   (e) a patch of said polyethylene material of a thickness of about four (4) mils and disposed in overlying relation to each of said pairs of magnets and each of said individual magnets and being adhesively secured to said body on all sides of each of said magnets including said magnets in each of said pairs to maintain the positional arrangement of said magnets relative to each other and relative to said body and to reinforce the portions of said body at which said magnets are disposed, and
   (f) a patch of pliable material of a contrasting color relative to said body adhesively secured to said one face of said body adjacent the top edge thereof and bearing indicia indicating that the edge of said body adjacent thereto is the top edge and indicating that the other face of said body should be placed in contiguous relation to the vehicle for maximum securement of the cover to the vehicle.

References Cited by the Examiner

UNITED STATES PATENTS

| | | | |
|---|---|---|---|
| 2,639,751 | 5/1953 | Flaherty. | |
| 2,649,330 | 8/1953 | Schamel et al. | 160—354 |
| 2,851,303 | 9/1958 | McQueen | 160—368 X |
| 2,967,845 | 1/1961 | Hawkins et al. | 260—41 |
| 3,016,952 | 1/1962 | Shero. | |
| 3,042,111 | 7/1962 | Wytovich | 160—368 X |
| 3,063,498 | 11/1962 | Ford | 160—368 |
| 3,118,207 | 1/1964 | Breslow. | |

HARRISON R. MOSELEY, *Primary Examiner.*

P. C. KANNAN, *Assistant Examiner.*